(12) United States Patent
Amanai

(10) Patent No.: US 7,009,784 B2
(45) Date of Patent: Mar. 7, 2006

(54) IMAGING OPTICAL SYSTEM AND ELECTRONIC APPARATUS USING THE SAME

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/855,961

(22) Filed: May 28, 2004

(65) Prior Publication Data

US 2004/0240082 A1    Dec. 2, 2004

(30) Foreign Application Priority Data

May 30, 2003   (JP)   ............................. 2003-154708
May 24, 2004   (JP)   ............................. 2004-153053

(51) Int. Cl.
    *G02A 9/34*    (2006.01)
(52) U.S. Cl. ...................................... 359/779; 359/771
(58) Field of Classification Search ................ 359/771, 359/772, 779

See application file for complete search history.

(56) References Cited

U.S. PATENT DOCUMENTS

| 5,969,883 A | 10/1999 | Yamakawa et al. | |
| 2005/0013017 A1 * | 1/2005 | Amanai | 359/781 |
| 2005/0057824 A1 * | 3/2005 | Amanai | 359/779 |

FOREIGN PATENT DOCUMENTS

| JP | 11-084234 | 3/1999 |
| JP | 2000-171697 | 6/2000 |

* cited by examiner

*Primary Examiner*—David N. Spector
(74) *Attorney, Agent, or Firm*—Pillsbury Winthrop Shaw Pittman LLP

(57) ABSTRACT

The image forming optical system of the present invention comprises, in order from an object side, a first lens which is meniscus lens having positive refracting power and a concave surface directed toward an object side, an aperture stop, a second lens having positive refracting power and a convex surface directed toward the object side, a third lens which is meniscus lens having negative refracting power and a convex surface directed toward an image side, and a fourth lens having positive refracting power.

11 Claims, 10 Drawing Sheets

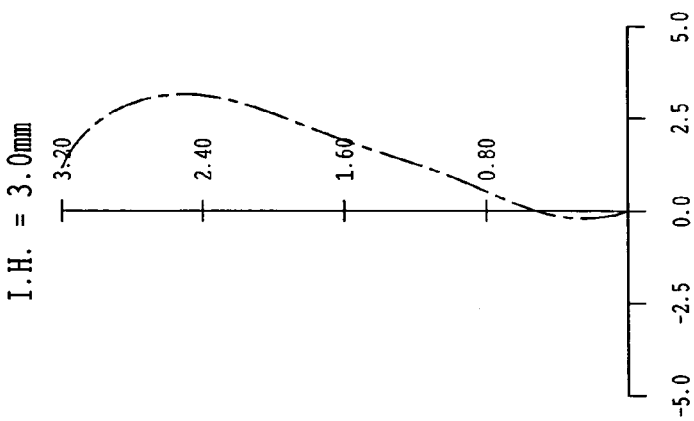
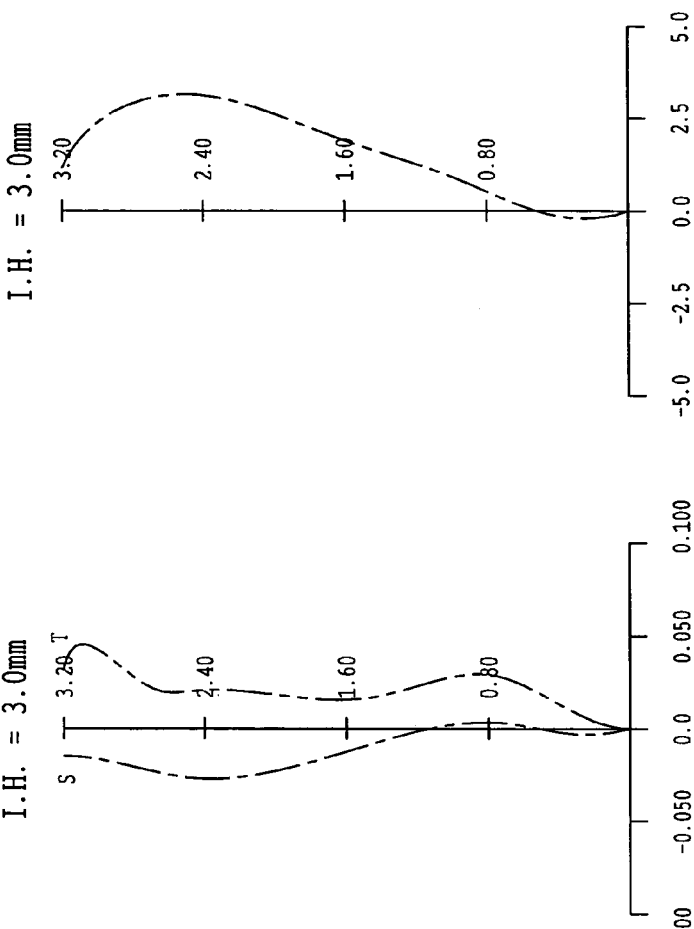
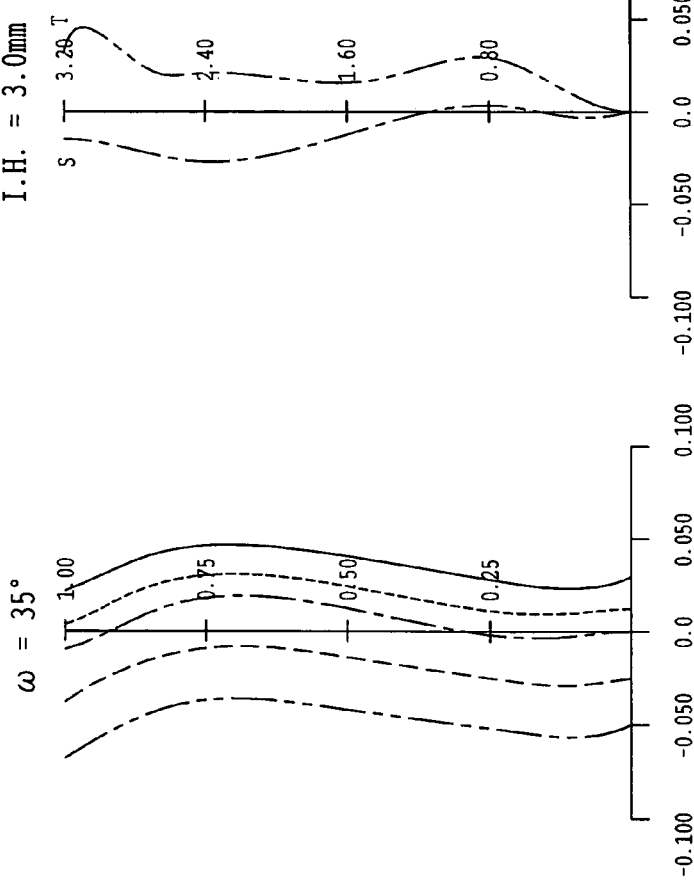

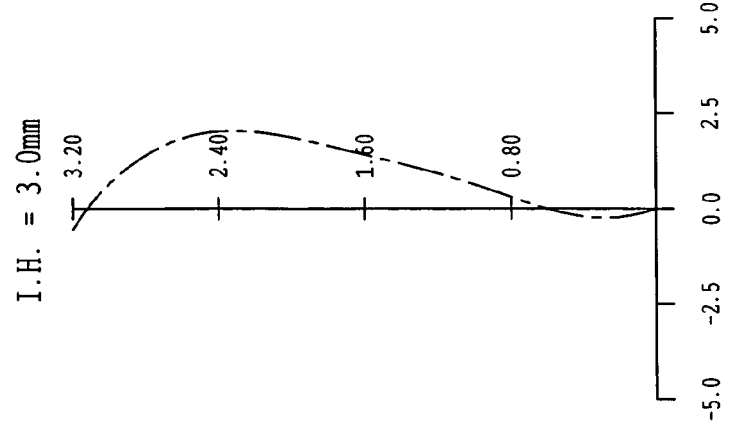
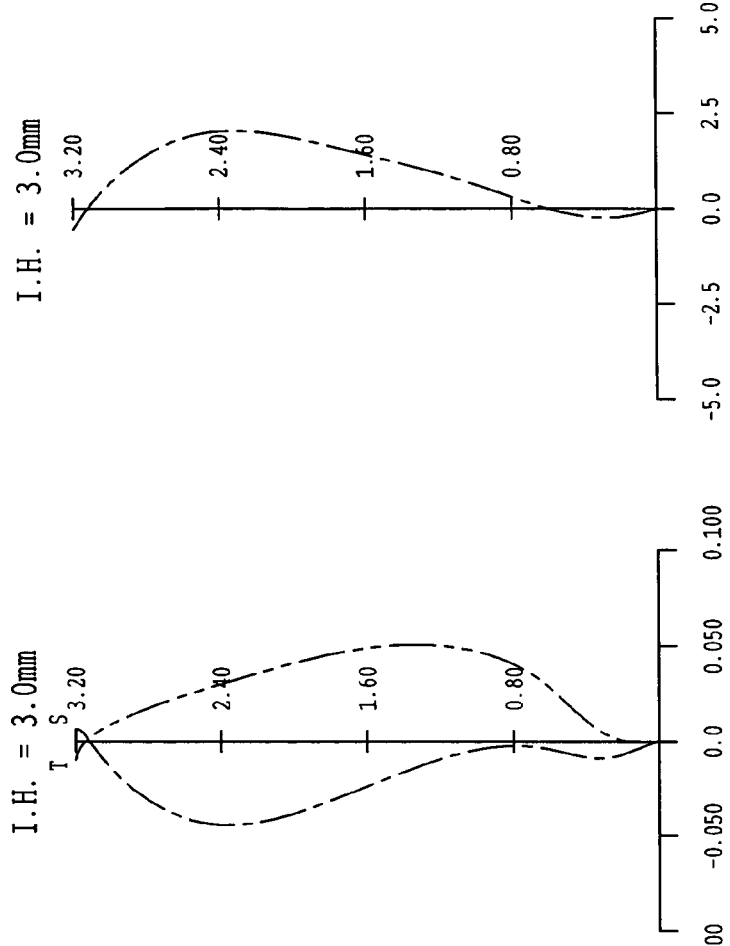
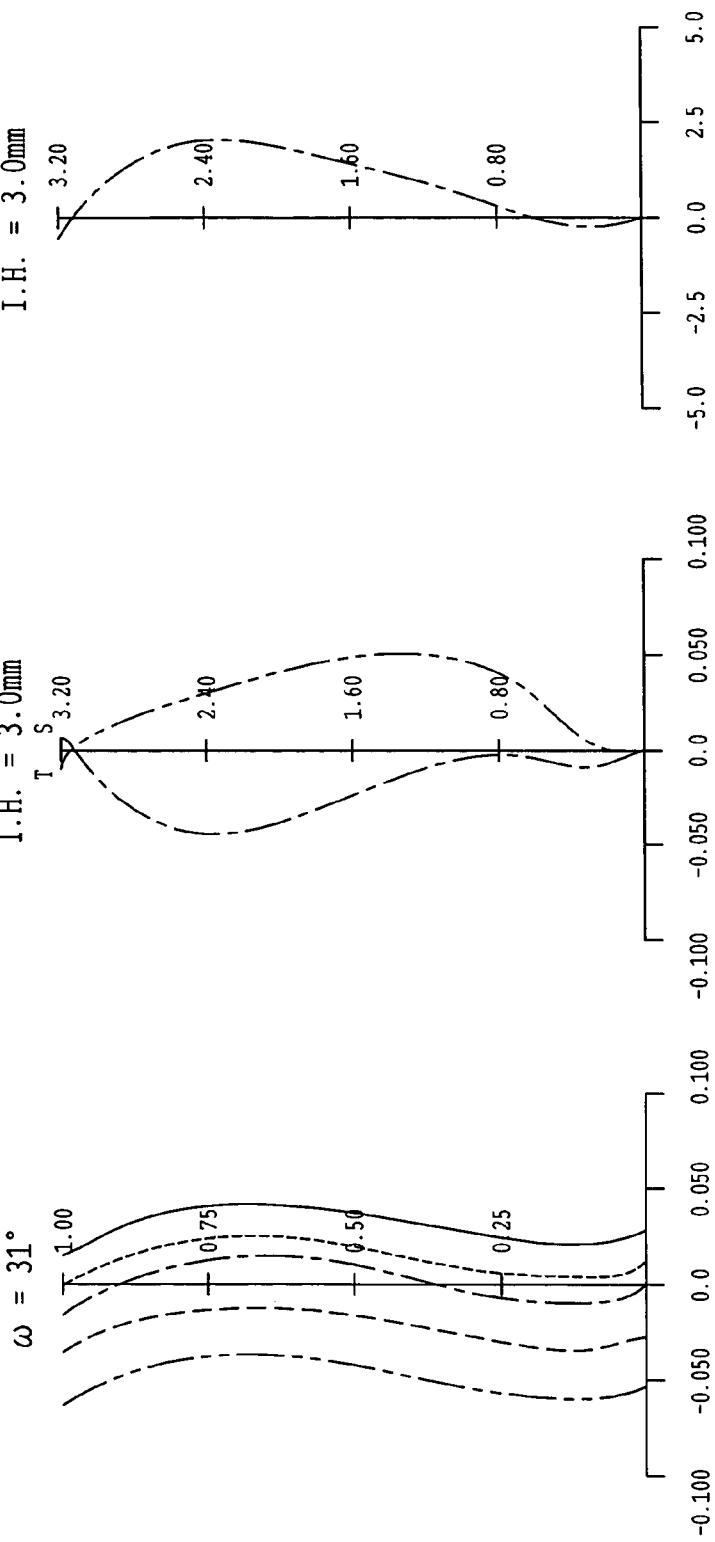

SPHERICAL ABERRATION
ω = 34°

ASTIGMATISM
I.H. = 3.0mm

DISTORTION
I.H. = 3.0mm 656.2700NM
587.5600NM
546.0700NM
486.1300NM
435.8400NM

Fig.10A
Fig.10B
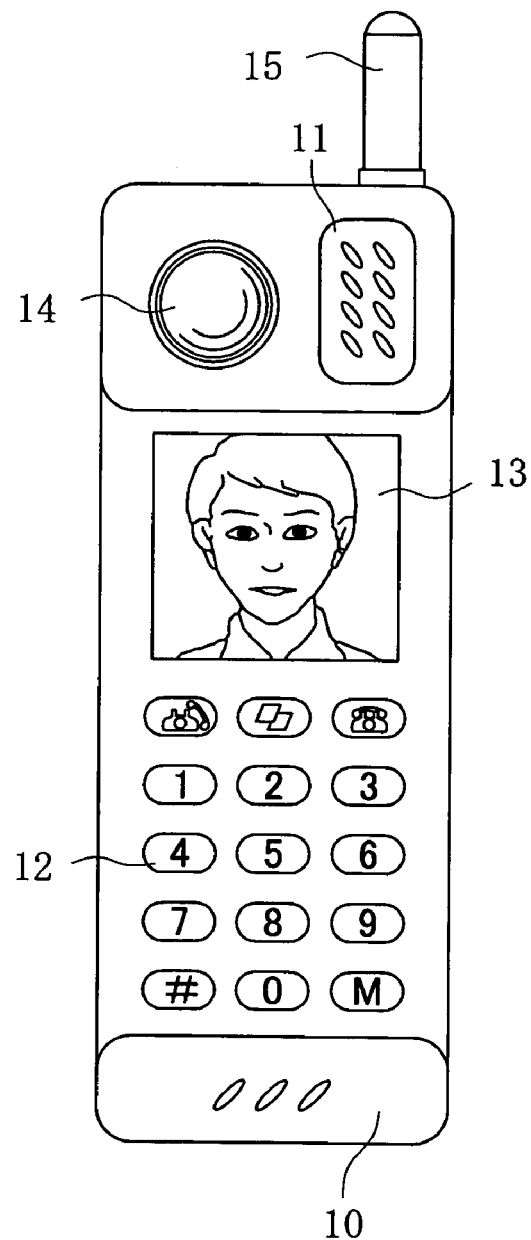
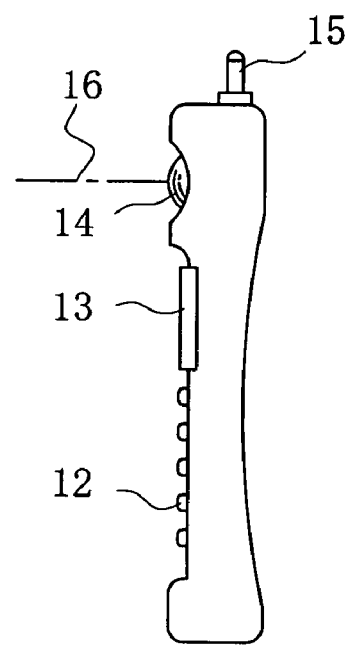

IMAGING OPTICAL SYSTEM AND ELECTRONIC APPARATUS USING THE SAME

BACKGROUND OF THE INVENTION

1. Field of the Invention

The present invention relates to an image forming optical system which can be used for an imaging unit with the solid-state imaging element of CCD, CMOS and the like. For example, it relates to an image forming optical system which can be used for a miniature camera and a monitor camera and the like which are equipped in, for example, a digital still camera, a digital video camera, a cellular phone, PC and the like.

Furthermore, the present invention also relates to an electronic instrument such as a digital still camera, a digital video camera, a cellular phone, PC and the like which use the image forming optical system.

2. Description of the Related Art

In recent years, electronic cameras for taking a photograph by using a solid-state imaging element like CCD and CMOS instead of using a silver salt film have become popular. In such electronic cameras, for an imaging unit which is equipped in a portable type computer or a cellular phone and the like, miniaturization and weight-lightening have been particularly demanded.

SUMMARY OF THE INVENTION

The image forming optical system of the present invention comprises, in order from an object side, a first lens which is meniscus lens having positive refracting power and a concave surface directed toward an object side, an aperture stop, a second lens having positive refracting power and a convex surface directed toward the object side, a third lens which is meniscus lens having negative refracting power and a convex surface directed toward an image side, and a fourth lens having positive refracting power.

The image forming optical system of the present invention comprises, in order from an object side, the first lens which is meniscus lens having positive refracting power and a concave surface directed toward an object side, an aperture stop, the second lens having positive refracting power and a convex surface directed toward the object side, the third lens which is meniscus lens having negative refracting power and a convex surface directed toward an image side, and the fourth lens having positive refracting power wherein at least one of surface directed toward an object side or a surface directed toward an image side of the fourth lens is aspherical.

The image forming optical system of the present invention comprises, in order from an object side, the first lens which is meniscus lens having positive refracting power and a concave surface directed toward an object side, the aperture stop, the second lens having positive refracting power and a convex surface directed toward the object side, the third lens which is meniscus lens having negative refracting power and a convex surface directed toward an image side, and the fourth lens having positive refracting power, or the image forming optical system comprises, in order from an object side, the first lens which is meniscus lens having positive refracting power and a concave surface directed toward an object side, the aperture stop, the second lens having positive refracting power and a convex surface directed toward the object side, the third lens which is meniscus lens having negative refracting power and a con-vex surface directed toward an image side and the fourth lens having positive refracting power wherein at least one of surfaces, one of which is directed toward the object side and another of which is directed toward the image side of the fourth lens is aspherical, and the following condition is satisfied:

$$0.3 < f12/f < 2.0$$

$$-0.30 < f12/f34 < 0.60$$

where f12 represents the whole focal length of the first lens and the second lens, f34 represents the whole focal length of the second lens and the third lens, and f represents the focal length of the whole image forming optical system.

In the image forming optical system according to the present invention, the following condition is satisfied.

$$0.30(1/\mu m) < Fno/P(\mu m) < 2.40(1/\mu m)$$

where Fno represents the F number fully opened and P represents the pixel pitch of an imaging element.

In the image forming optical system according to the present invention, the following condition is satisfied.

$$0.02 < ML/TL < 0.15$$

where TL represents whole length of the image forming optical system and ML represents the minimum thickness on the axis of a plastic lens.

The electric device according to the present invention is equipped with the image forming optical system mentioned above.

These and other features and advantages of the present invention becomes apparent from the following detailed description of the preferred embodiments when taken in conjunction with the accompanying drawings.

BRIEF DESCRIPTION OF THE DRAWINGS

FIGS. 2A, 2B and 2C are graphs showing spherical aberration, astigmatism and distortion in the first embodiment of an image forming optical system according to the present invention.

FIGS. 6A, 6B and 6C are graphs showing spherical aberration, astigmatism and distortion in the third embodiment of an image forming optical system according to the present invention.

FIGS. 10A and 10B are a front perspective view and a rear perspective view showing an outlined construction of a digital camera embodied by an image forming optical system according to the present invention.

DETAILED DESCRIPTION OF THE PREFERRED EMBODIMENTS

Figure 1:
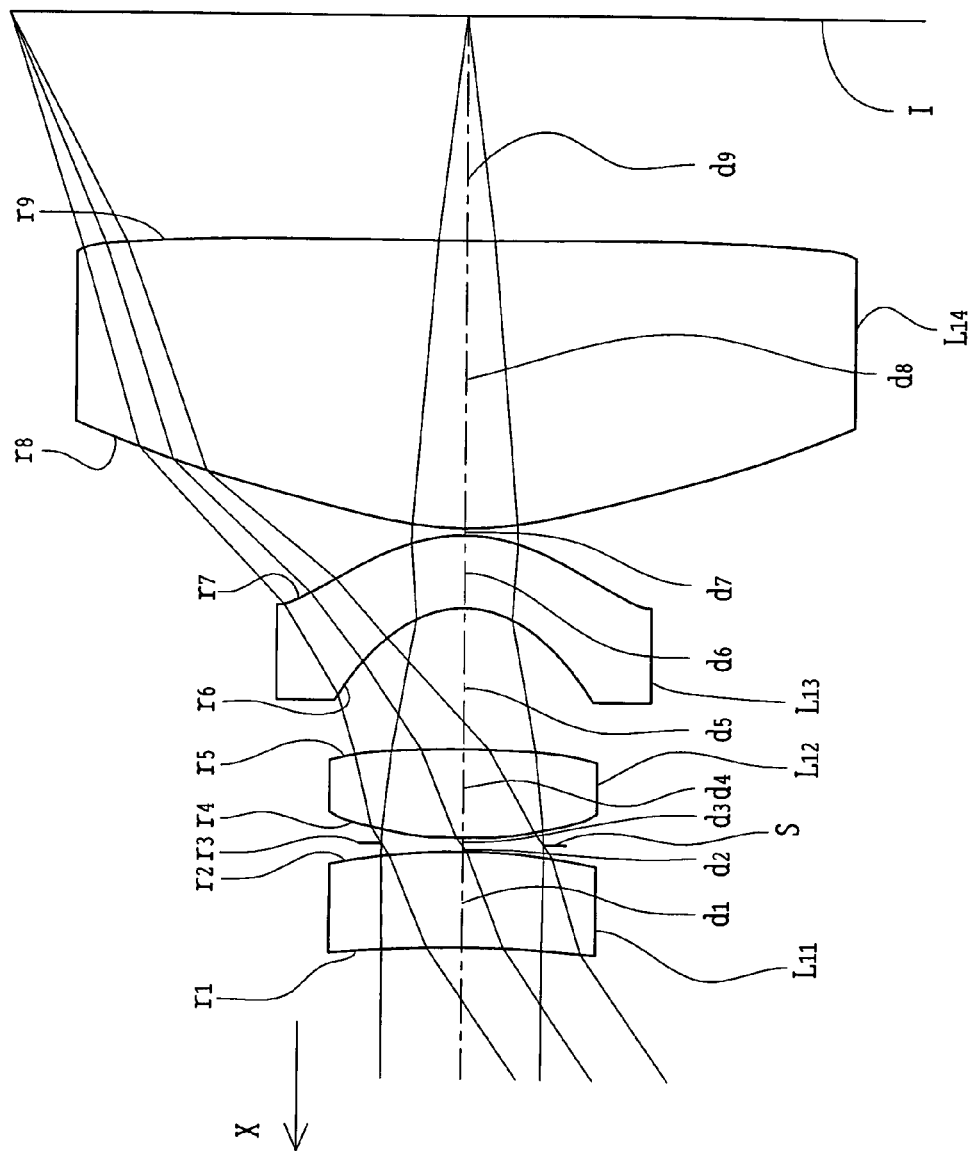
FIG. 1 is a sectional view showing an optical arrangement developed along the optical axis in the first embodiment of an image forming optical system according to the present invention.

Prior to explaining embodiments, reasons why the constitution of the present invention has been made as well as function and advantages of the present invention will be explained.

The image forming optical system of the present invention comprises, in order from an object side, a first lens which is meniscus lens having positive refracting power and a concave surface directed toward an object side, an aperture stop, a second lens having positive refracting power and a convex surface directed toward the object side, the third lens which is meniscus lens having negative refracting power and a convex surface directed toward an image side and a fourth lens having negative refracting power.

Taking into consideration of performance and miniaturization, the image forming optical system of the present invention is constituted with four lenses which are the first lens, the second lens, the third lens and the fourth lens as mentioned above.

Here, if an image forming optical system is constituted with five or more lenses, it is evident that the performance is improved further. However, if the number of lens increases by one lens, the thickness of a lens, the distance between lenses and the space of frame increase accordingly, and enlarging of the size is inevitable. In case that an image forming optical system is constituted with three lenses or less than three lenses coexistence of axis top chromatic aberration and a curvature of field is difficult. Even if many aspherical surfaces are used to secure performance, difficulty arises in manufacture since decentering sensitivity becomes large. Therefore, as for performance and size, it is optimal to constitute an image forming optical system with four lenses.

In the image forming optical system of the present invention, the first lens having positive refracting power is constituted with a meniscus lens having concave surface at the object side. By this constitution, a wide angle optical system can be attained since the surface at the utmost object side becomes negative power.

In the image forming optical system of the present invention, the position of an aperture stop is arranged between the first lens and the second lens.

When CCD is used, for example, as an imaging element in order to maintain a good performance for condensing light, the incident angle of light to an imaging element must be made small. For this purpose, it is desirable to arrange an aperture stop or an image of the aperture stop at a distant position from an image plane. In a wide angle optical system it is necessary to reduce generation of distortion in a circumferential portion of a picture image plane and a magnification chromatic aberration. For this purpose, it is desirable to arrange a brightness aperture stop in the position where power arrangement of an optical system becomes symmetrical. From such reasons, in the present invention, the brightness aperture stop is arranged between the first lens and the second lens. By such arrangement, an optical system in which wide angle and telecentric function are much noted as important factors is realized.

In the image forming optical system of the present invention, the third lens is a negative meniscus lens having a convex surface directed toward the image side. By such constitution, the angle which is defined by an incident light and an emanated light, namely, a deflection angle, can be kept small, and the amount of generation of aberration in each refraction surface can be small as much as possible. Since the amount of generation of the aberration is small when non-decentering, the fluctuation of performance at the time of the relative decentering of a lens can be also small as much as possible.

In the image forming optical system of the present invention, at least one of surfaces of the fourth lens which are at an object side or at an image side is formed to be aspheric surface. In such constitution, the fourth lens greatly refracts a circumferential light toward inside in order to make an incident angle of the light to an imaging element small. In this case, an aberration is easily generated. Accordingly, at least one of surfaces is made to be an aspheric surface, so that an angle formed by the incident light and the emanated light to the fourth lens, i.e., a deflection angle is minimum. In this way, it is possible to make the incident angle of the light to an imaging element small, while suppressing generation of an aberration.

In the image forming optical system of the present invention, composite power of the first lens and the second lens is made to be strong positive power. And composite power of the third lens and the fourth lens is made to be weak positive power or a negative power. By constituting in this way, the whole length of the image forming optical system is made small.

Therefore, in order to attain the whole length and performance with sufficient balance to this type of power arrangement, it is desirable to satisfy the following condition:

$$0.3 < f12/f < 2.0$$

$$-0.30 < f12/f34 < 0.60$$

where, f12 is the composite focal length of the first lens and the second lens, f34 is the composite focal length of the 3rd lens and the 4th lens, and f is the whole focal length of the image forming optical system.

That is, if f12/f or f12/f34 exceeds the upper limit of this condition, the composite power of the first lens and the second lens becomes small. Therefore it is disadvantageous to shorten the whole length. On the other hand, if it is less than this minimum, the composite power of the first lens and the second lens becomes large. In connection with it, power of the third lens and the fourth lens must also be made strong to the negative side, the aberration generated in each lens increases, and it becomes difficult to secure the performance.

It is desirable to satisfy the following condition:

$$0.5 < f12/f < 1.5$$

$$-0.10 < f12/f34 < 0.40$$

Furthermore Further, it is desirable to satisfy the following condition:

$$0.7 < f12/f < 1.0$$

$$-0.07 < f12/f34 < 0.30$$

In the image forming optical system of the present invention, it is necessary that the incident surface at the utmost an object side is formed so as to have properly negative power in order to take large angle of field. Therefore, the radius of curvature of the first lens becomes important. Therefore, it is good to satisfy the following condition:

$$-0.50 < f/r1f < 0$$

where f is the focal length of the image forming optical system as a whole system, and r1f is a radius of curvature of a surface of the object side of the first lens.

When f/r1f exceeds the upper limit of this condition, the power of the first surface becomes small too much, and it becomes impossible to attain a wide angle optical system. On the other hand, if it is less than the lower limit, the power of the first surface becomes large too much, and correction of the spherical aberration generated in the first surface becomes difficult.

Since a principal point position moves to the image plane side, the whole length becomes long and accordingly miniaturization cannot be achieved.

It is desirable to satisfy the following condition:

$$-0.30 < f/r1f < 0$$

Furthermore, it is desirable to satisfy the following condition:

$$-0.20 < f/r1f < -0.01$$

In the image forming optical system of the present invention, the fourth lens is an important lens in order that an incident angle of the light to an imaging element is made small. Therefore, it is important to satisfy the following conditions:

$$0.5 < f4/f < 2.0$$

where f4 is the focal length of the fourth lens, and f is the focal length of the image forming optical system as a whole system. If f4/f exceeds the upper limit of this condition, the power of the fourth lens becomes small too much, and an incident angle of the light to an imaging element becomes large. As the result, the difference of the brightness between the center and the circumference of the picture image plane becomes remarkable. On the other hand, if it is less than the lower limit, an incident angle of the light to an imaging element becomes over corrected. Furthermore, the principal point position of the optical system as a whole system moves to the image side and the whole length becomes long because the power of the fourth lens becomes large. Then, it is desirable to satisfy the following condition:

$$0.7 < f4/f < 1.6$$

Furthermore, it is desirable to satisfy the following condition:

$$0.9 < f4/f < 1.2$$

When CCD is used as an imaging element, the phenomenon of so-called shading occurs. This is the phenomenon in which the brightness of a portion of a picture image changes (differs) in the central portion and in the circumferential portion of the picture image plane when an off axial luminous flux emanated from the optical system is entered into an image plane at too much large angle. On the one hand, if the incident angle to the image plane is small, this problem is mitigated. But, on the other hand, the whole length of an image forming optical system becomes large.

Therefore, it is good to satisfy the following condition:

$$0.5 < EXP/f < 2.5$$

where EXP is the distance to the exit pupil from an image plane, and f is the focal length of the image forming optical system as a whole system.

If EXP/f exceeds the upper limit of this condition, the whole length of an image forming optical system becomes large. On the other hand, if it is less than the lower limit, the incident angle to CCD becomes large too much, and the brightness of the circumferential portion of the picture falls. Then, it is desirable to satisfy the following condition:

$$0.8 < EXP/f < 2.0$$

Furthermore, it is more desirable to satisfy the following condition:

$$1.2 < EXP/f < 1.6$$

In the image forming optical system of the present invention, the fourth lens of positive refracting power can be constituted with plastic materials. Thus, by constituting in this way, weight saving and reduction of manufacture cost can be achieved.

In the image forming optical system of the present invention, the third meniscus lens of negative refracting power can be constituted with plastic materials. By constituting in this way, weight saving and reduction of manufacture cost can be achieved.

It is good to satisfy the following condition when Fno represents fully opened F number of an image forming optical system, and P is the pixel pitch of an imaging element.

$$0.30[1/\mu m] < Fno/P[\mu m] < 2.40[1/\mu m]$$

If Fno/P exceeds the upper limit of this condition, an optical system becomes dark too much. Or when a pixel pitch becomes small too much, the quantity of light per pixel decreases. Accordingly, shutter speed becomes slow and, this may cause hand blur and increase of noise owing to long exposure time. On the other hand, if it is less than the lower limit, a pixel pitch becomes too much large and an imaging data with fine picture element cannot be obtained.

In the image forming optical system of the present invention it is better to satisfy the following condition:

$$0.40[1/\mu mm] < Fno/P[\mu m] < 1.90 \ [1/\mu m]$$

Furthermore, in the image forming optical system of the present invention, it is much better to satisfy the following condition:

$$0.50[1/\mu m] < Fno/P[\mu m] < 1.40 \ [1/\mu m]$$

Moreover, it is good to satisfy the following condition:

$$0.02 < ML/TL < 0.15$$

where TL represents whole length of the image forming optical system and ML represents the minimum thickness on the axis of a plastic lens constituting the image forming optical system.

When ML/TL exceeds the upper limit of this condition, thickness on the axis of a plastic lens to the whole length becomes too large. Therefore, a thickness of the center portion of a glass lens cannot be sufficiently secured, and the processability of the glass lens gets worse. On the other hand, if it is less than the lower limit, it is impossible for plastic resin to enter smoothly into a formation die at the time of molding, because the minimum thickness on the axis of the plastic lens is too small. As a result, as a stress is generated, it may cause double refraction, and productivity is aggravated since longer time is consumed for molding.

In the image forming optical system of the present invention, it is better to satisfy the following condition:

0.04<$ML/TL$<0.12

Furthermore, in the image forming optical system of the present invention, it is much better to satisfy the following condition:

0.06<$ML/TL$<0.09

As for an electric device, it is desirable that it has an image forming optical system mentioned above.

Hereafter, the embodiment of the present invention is explained using drawings.

The First Embodiment

FIG. 1 is a sectional view showing an optical arrangement developed along the optical axis in the first embodiment of an image forming optical system according to the present invention. FIGS. 2A, 2B and 2C show spherical aberration, astigmatism and distortion at the focused state of an image forming optical system in the first embodiment respectively.

In FIG. 1, this image forming optical system comprises, in order from an object side, a lens L11 which is meniscus lens having positive refracting power, an aperture stop S, a lens 12 having positive refracting power, a lens 13 which is meniscus lens having negative refracting power, and a lens 14 having positive refracting power. In FIG. 1, the reference symbol I represents an image plane of an imaging element. Both surfaces of these lenses L11, L12, L13 and L14 are aspherical.

The meniscus lens L11 having positive refracting power is the first lens, a concave surface of which is directed toward an object side. The lens 12 having positive refracting power is the second lens. The meniscus lens 13 having negative refracting power is the third lens, a convex surface of which is directed toward an image side. The lens 14 having positive refracting power is the fourth lens.

In this embodiment, all lenses are made of plastic. As plastic materials used here, Zeonex (registered trademark) which is polyolefin material is used for the first lens L11, the second lens L12 and the fourth lens L14, and polycarbonate is used for the third lens.

On the image plane of the image forming optical system, an imaging element having 2,000,000 pixels (a pitch of picture element 3.0 μm) in ⅓ inches square is arranged.

This embodiment is a wide angle optical system where the focal length is 4.30 mm, Fno (fully opened F number) is 4.0, the image height is 3.0 mm, and half angle of field is 35°.

Lens data of optical members constituting the image forming optical system of the first embodiment are listed below.

In the numerical data, $r_1$, $r_2$, - - - denote radii of curvature of individual lens surfaces; $d_1$, $d_2$, - - - denote thickness of individual lenses or air space between them; $n_{d1}$, $n_{d2}$, - - - denote refractive indices of individual lenses at the d line; $v_{d1}$, $v_{d2}$, - - - denotes Abbe's numbers of individual lenses; Fno. denotes an F number; f denotes the whole focal length of the image forming optical system, and D0 denotes distance from an object to the first surface of a lens element.

Also, when z is taken as the coordinate in the direction of the optical axis, y is taken as the coordinate normal to the optical axis, K represents a conic constant, and $A_4$, $A_6$, $A_8$ and $A_{10}$ represent aspherical coefficients, the configuration of each of the aspherical surface is expressed by the following equation:

$$Z = (y^2/r)/[1+\{1-(1+K)(y/r)^2\}^{1/2}] + A_4 y^4 + A_6 y^6 + A_8 y^8 + A_{10} y^{10}$$

These symbols hold for the numerical data of embodiments to be described later.

numerical data 1 object surface (distance from an object) ∞

Figure 3:
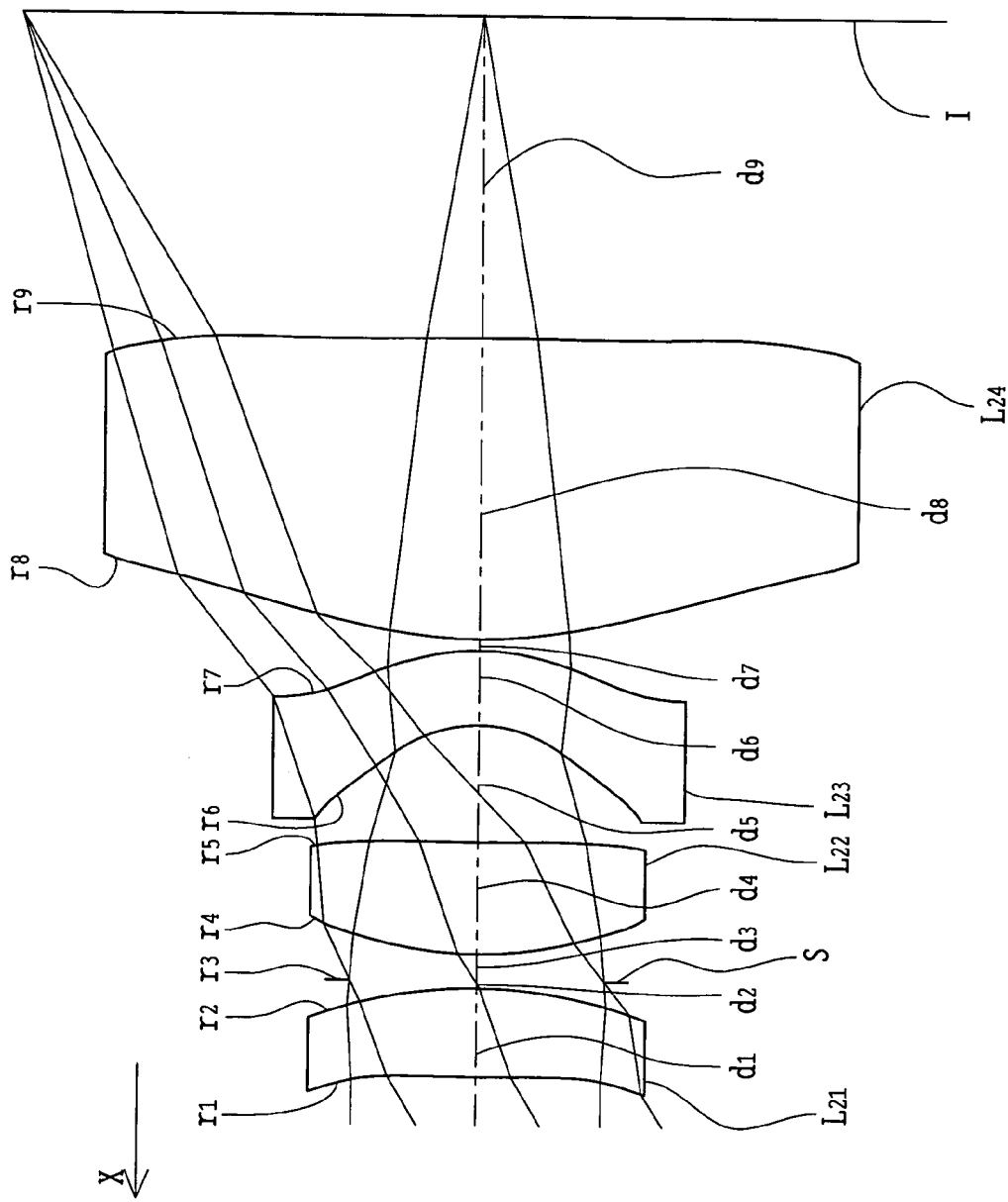
FIG. 3 is a sectional view showing an optical arrangement, developed along the optical axis in the second embodiment of an image forming optical system according to the present invention.
Figure 4:
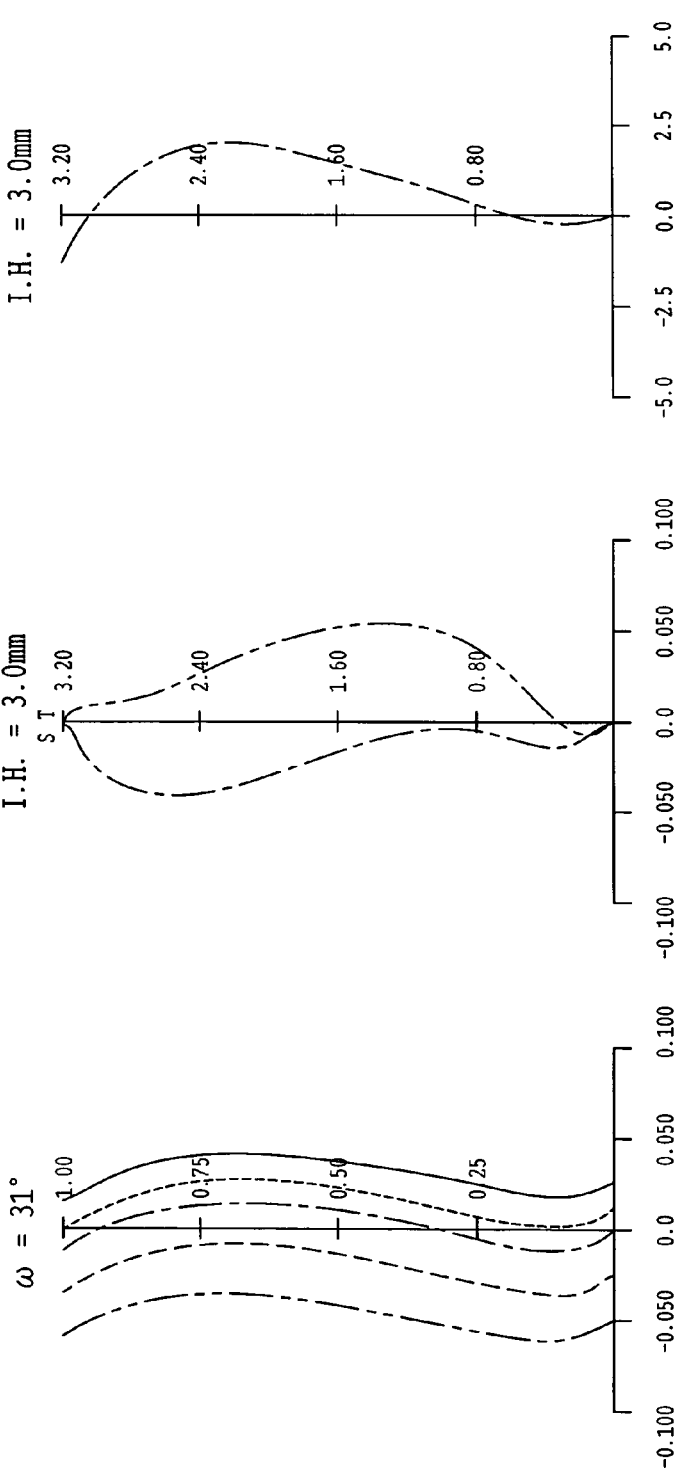
FIGS. 4A, 4B and 4C are graphs showing spherical aberration, astigmatism and distortion in the second embodiment of an image forming optical system according to the present invention.

| | | | |
|---|---|---|---|
| r1 = −271.81 (aspherical surface) | d1 = 0.66 | nd1 = 1.5256 | vd1 = 56.4 |
| r2 = −5.10 (aspherical surface) | d2 = 0.05 | | |
| r3 = ∞ (aperture stop) | d3 = 0.05 | | |
| r4 = 3.28 (aspherical surface) | d4 = 0.61 | nd4 = 1.5256 | vd4 = 56.4 |
| r5 = −9.12 (aspherical surface) | d5 = 0.99 | | |
| r6 = 0.57 (aspherical surface) | d6 = 0.50 | nd6 = 1.5839 | vd6 = 30.2 |
| r7 = −1.09 (aspherical surface) | d7 = 0.05 | | |
| r8 = 2.17 (aspherical surface) | d8 = 2.00 | nd8 = 1.5256 | vd8 = 56.4 |
| r9 = 236.09 (aspherical surface) | d9 = 1.55 | | |
| P = ∞ (image plane) | | | | aspherical surface coefficient the first surface $K = -2.7210 \times 10^{-5}$
$A4 = -6.7464 \times P10^{-2}$   $A6 = 1.1364 \times 10^{-2}$ the second surface $K = 2.3300$
$A4 = -6.1688 \times 10^{-2}$   $A6 = 5.7802 \times 10^{-3}$ the fourth surface $K = 6.1445$
$A4 = 4.6994 \times 10^{-2}$   $A6 = -2.0949 \times 10^{-2}$ the fifth surface $K = 0$
$A4 = -1.8079 \times 10^{-2}$   $A6 = -4.4733 \times 10^{-2}$ the sixth surface $K = -8.4960 \times 10^{-1}$
$A4 = 3.1949 \times 10^{-1}$   $A6 = -1.2238 \times 10^{-1}$ the seventh surface $K = -8.4248 \times 10^{-1}$
$A4 = 7.3059 \times 10^{-2}$   $A6 = 2.5423 \times 10^{-2}$ the eighth surface $K = -1.1014 \times 10^{-1}$
$A4 = -1.4291 \times 10^{-3}$ the nineth surface $K = -1.8617 \times 10^{-11}$
$A4 = 1.1536 \times 10^{-3}$   $A6 = -4.1752 \times 10^{-4}$ The Second Embodiment FIG. 3 is a sectional view showing an optical arrangement developed along the optical axis in the second embodiment of an image forming optical system according to the present invention. FIGS. 4A, 4B and 4C show spherical aberration, astigmatism and distortion at the focused state of an image forming optical system in the second embodiment respectively.

In FIG. 3, this image forming optical system comprises, in order from an object side, a lens L21 which is meniscus lens having positive refracting power, an aperture stop S, a lens 22 having positive refracting power, a lens 23 which is meniscus lens having negative refracting power, and a lens 24 having positive refracting power. In FIG. 3, the reference symbol I represents an image plane of an imaging element. Both surfaces of these lenses L21, L22, L23 and L24 are aspherical.

The meniscus lens L21 having positive refracting power is the first lens, a concave surface of which is directed toward an object side. The lens 22 having positive refracting power is the second lens. The meniscus lens 23 having negative refracting power is the third lens, a convex surface of which is directed toward an image side. The lens 24 having positive refracting power is the fourth lens.

In this embodiment, all lenses are made of plastic. As plastic materials used here, Zeonex (registered trademark) which is polyolefin material is used for the first lens L21, the second lens L22 and the fourth lens L24, and polycarbonate is used for the third lens L23.

On the image plane of the image forming optical system, an imaging element having 3,000,000 pixels (a pitch of picture element 2.4 $\mu$m) in ⅓ inches square is arranged.

This embodiment is a wide angle optical system where the focal length is 4.90 mm, Fno (fully opened F number) is 3.0, the image height is 3.0 mm, and half angle of field is 31°.

Numerical data of the optical components of the second embodiment is shown as follows.

numerical data 2 object surface (distance from an object) ∞

| | | | |
|---|---|---|---|
| r1 = −300.00 (aspherical surface) | d1 = 0.58 | nd1 = 1.5256 | vd1 = 56.4 |
| r2 = −4.47 (aspherical surface) | d2 = 0.05 | | |
| r3 = ∞ (aperture stop) | d3 = 0.18 | | |
| r4 = 3.09 (aspherical surface) | d4 = 0.73 | nd4 = 1.5256 | vd4 = 56.4 |
| r5 = 39.05 (aspherical surface) | d5 = 0.79 | | |
| r6 = −0.71 (aspherical surface) | d6 = 0.50 | nd6 = 1.5839 | vd6 = 30.2 |
| r7 = −1.34 (aspherical surface) | d7 = 0.07 | | |
| r8 = 2.58 (aspherical surface) | d8 = 2.00 | nd8 = 1.5256 | vd8 = 56.4 |
| r9 = 172.93 (aspherical surface) | d9 = 2.13 | | |
| P = ∞ (imaging plane) | | | | aspherical surface coefficient the first surface

K = −7.8982 × 10$^{-4}$
A4 = −6.4843 × 10$^{-2}$   A6 = −6.6742 × 10$^{-3}$ the second surface

K = 2.3300
A4 = −6.1688 × 10$^{-3}$   A6 = 5.7802 × 10$^{-3}$ the fourth surface

K = 7.8059
A4 = −4.7936 × 10$^{-2}$   A6 = 7.9572 × 10$^{-3}$ the fifth surface

K = 0
A4 = −7.8795 × 10$^{-4}$   A6 = −1.8639 × 10$^{-2}$   A8 = −7.5368 × 10$^{-3}$ the sixth surface K = −9.2508 × 10$^{-1}$
A4 = 2.3395 × 10$^{-1}$   A6 = −6.4281 × 10$^{-2}$   A8 = 4.9060 × 10$^{-4}$ the seventh surface K = −1.0226
A4 = 8.2018 × 10$^{-2}$   A6 = 1.6439 × 10$^{-2}$   A8 = −7.2317 × 10$^{-4}$ -continued numerical data 2
the eighth surface

K = −1.2345 × 10
A4 = 6.7656 × 10$^{-4}$   A6 = −3.6700 × 10$^{-5}$ the nineth surface

K = −1.8617 × 10$^{-11}$
A4 = 1.4777 × 11$^{-3}$   A6 = −8.6051 × 10$^{-4}$

The Third Embodiment

Figure 5:
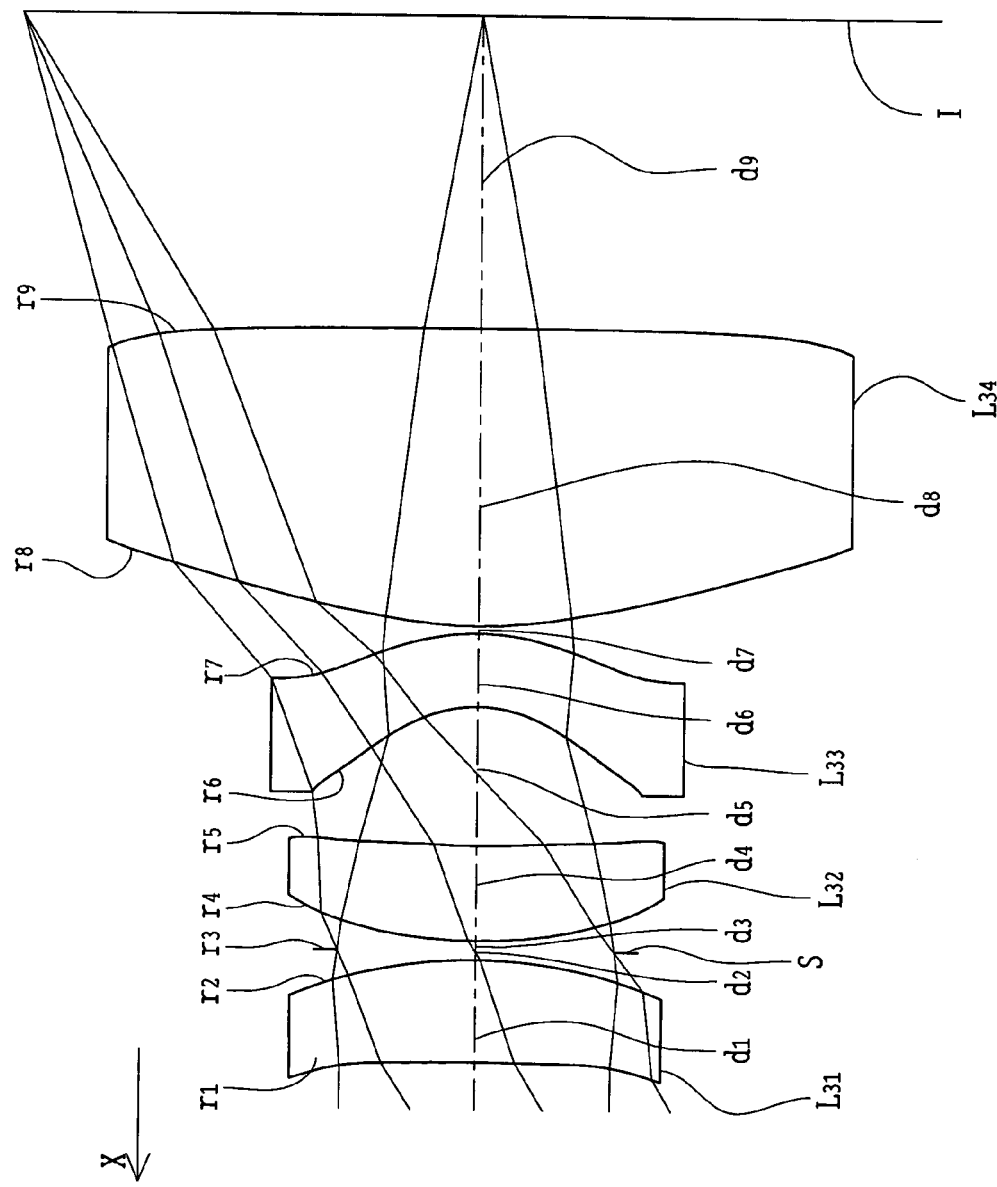
FIG. 5 is a sectional view showing an optical arrangement, developed along the optical axis in the third embodiment of an image forming optical system according to the present invention.

FIG. 5 is a sectional view showing an optical arrangement developed along the optical axis in the third embodiment of an image forming optical system according to the present invention. FIG. 6 shows spherical aberration, astigmatism and distortion at the focused state of an image forming optical system in the third embodiment respectively.

In FIG. 3, this image forming optical system comprises, in order from an object side, a lens L31 which is meniscus lens having positive refracting power, an aperture stop S, a lens 32 having positive refracting power, a lens L33 which is meniscus lens having negative refracting power, and a lens 34 having positive refracting power. In FIG. 1, the reference symbol I represents an image plane of an imaging element. Both surfaces of these lenses L31, L32, L33 and L34 are aspherical.

The lens L31 which is meniscus lens having positive refracting power is the first lens, a concave surface of which is directed toward an object side. The lens 32 having positive refracting power is the second lens. The meniscus lens 33 having negative refracting power is the third lens, a convex surface of which is directed toward an image side. The lens 34 having positive refracting power is the fourth lens.

In this embodiment, the first lens L31 is made of glass. The second lens L32, the third lens L33 and the fourth lens L34 are made of plastic.

As plastic materials used here, polycarbonate is used for the third lens L33, and Zeonex (registered trademark) which is polyolefin material is used for the second lens L32 and the fourth lens L34.

On the image plane of the image forming optical system, an imaging element having 2,000,000 pixels (a pitch of picture element 3.0 $\mu$m) in ⅓ inches square is arranged.

This embodiment is a wide angle optical system where the focal length is 4.90 mm, Fno (fully opened F number) is 2.8, the image height is 3.0 mm, and half angle of field is 31°.

Numerical data of the optical components of the third embodiment is shown as follows.

numerical data 3 object surface (distance from an object) ∞

| | | | |
|---|---|---|---|
| r1 = −193.36 (aspherical surface) | d1 = 0.69 | nd1 = 1.5831 | vd1 = 59.4 |
| r2 = −3.28 (aspherical surface) | d2 = 0.05 | | |
| r3 = ∞ (aperture stop) | d3 = 0.08 | | |
| r4 = 4.47 (aspherical surface) | d4 = 0.64 | nd4 = 1.5256 | vd4 = 56.4 |
| r5 = 11.35 (aspherical surface) | d5 = 0.92 | | |
| r6 = −0.78 (aspherical surface) | d6 = 0.50 | nd6 = 1.5839 | vd6 = 30.2 |

-continued numerical data 3 r7 = −1.38 (aspherical surface)   d7 = 0.05
r8 = 2.84 (aspherical surface)    d8 = 2.00   nd8 = 1.5256   vd8 = 56.4
r9 = 231.45 (aspherical surface)  d9 = 2.09
P = ∞ (image plane)

aspherical surface cosfficient the first surface

K = −2.6850 × 10$^5$
A4 = −6.2047 × 10$^{-2}$    A6 = 2.8252 × 10$^{-3}$ the second surface

K = 6.6594 × 10$^{-1}$
A4 = −1.2310 × 10$^{-2}$    A6 = −5.3142 × 10$^{-4}$ the fourth surface

K = 7.5902
A4 = 4.6552 × 10$^{-2}$    A6 = −2.3834 × 10$^{-3}$ the fifth surface

K = 0
A4 = −4.8378 × 10$^{-3}$    A6 = −7.5951 × 10$^{-3}$ the sixth surface

K = −8.0643 × 10$^{-1}$
A4 = 2.2939 × 10$^{-1}$    A6 = −3.7555 × 10$^{-2}$ the seventh surface

K = −8.9580 × 10$^{-1}$
A4 = 9.5163 × 10$^{-2}$    A6 = 6.4385 × 10$^{-3}$ the eighth surface

K = −1.0500 × 10
A4 = 6.7626 × 10$^{-5}$ the nineth surface

K = −1.8617 × 10$^{-11}$
A4 = 6.3357 × 10$^{-4}$    A6 = −7.1839 × 10$^{-4}$

The Fourth Embodiment

Figure 7:
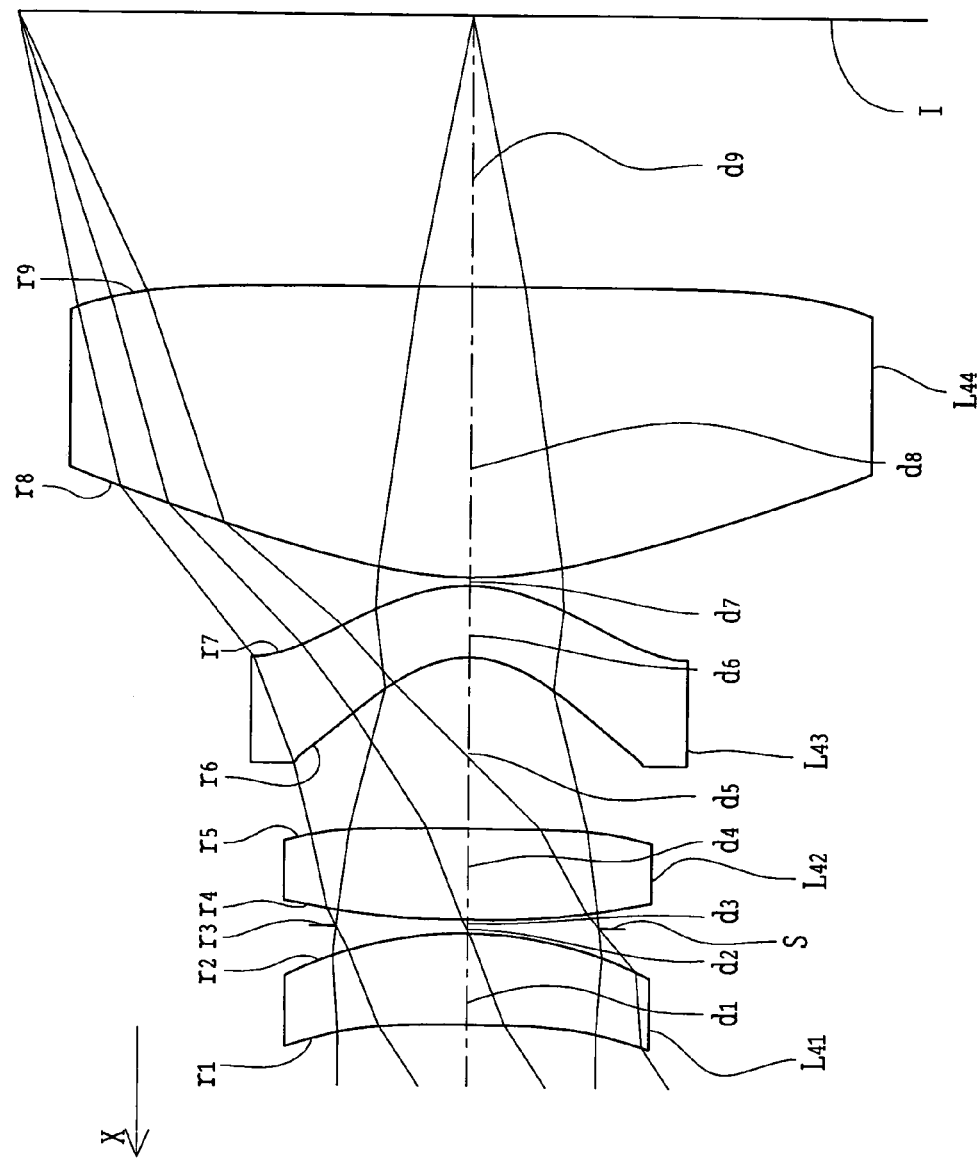
FIG. 7 is a sectional view showing an optical arrangement, developed along the optical axis in the fourth embodiment of an image forming optical system according to the present invention.
Figure 8A:
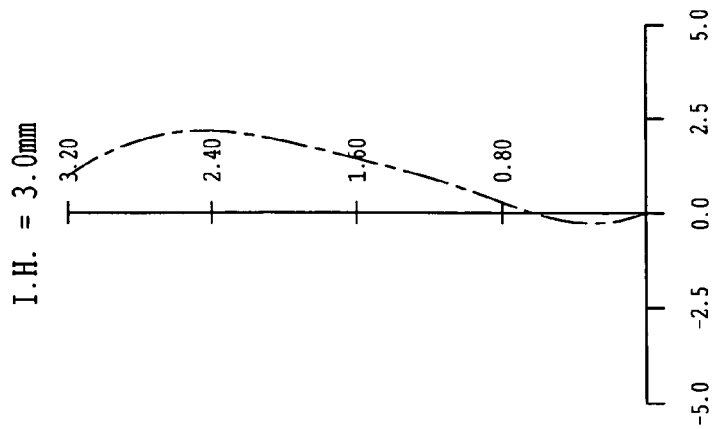
FIGS. 8A, 8B and 8C are graphs showing a spherical aberration, an astigmatism and a distortion in the fourth embodiment of an image forming optical system according to the present invention.
Figure 8B:
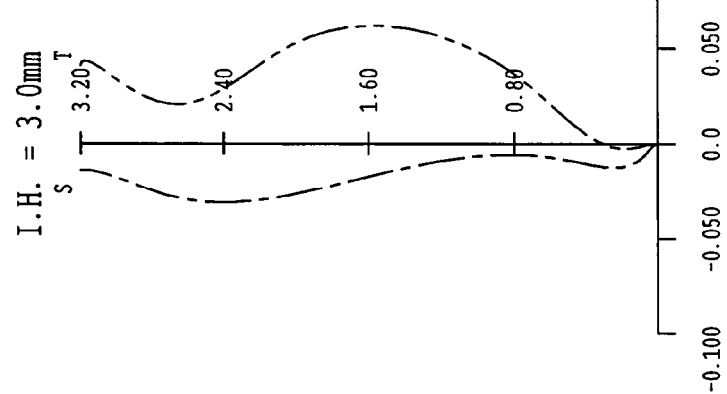
Figure 8C:

FIG. 7 is a sectional view showing an optical arrangement developed along the optical axis in the fourth embodiment of an image forming optical system according to the present invention. FIG. 8 shows spherical aberration, astigmatism and distortion at the focused state of an image forming optical system in the fourth embodiment respectively.

In FIG. 7, this image forming optical system comprises, in order from an object side, a lens L41 which is meniscus lens having positive refracting power, an aperture stop S, a lens 42 having positive refracting power, a lens 43 which is meniscus lens having negative refracting power, and a lens 44 having positive refracting power. In FIG. 7, the reference symbol I represents an image plane of an imaging element. Both surfaces of these lenses L41, L42, L43 and L44 are aspherical.

The meniscus lens 41 having positive refracting power is the first lens, a concave surface of which is directed toward an object side. The lens 42 having positive refracting power is the second lens. The meniscus lens 43 having negative refracting power is the third lens, a convex surface of which is directed toward an image side. The lens 14 having positive refracting power is the fourth lens.

In this embodiment, the first lens L41 is made of glass. The second lens L42, the third lens L43 and the fourth lens L44 are made of plastic.

As plastic materials used here, polycarbonate is used for the third lens, and Zeonex (registered trademark) which is polyolefin material is used for the second lens L42 and the fourth lens L44.

On the image plane of the image forming optical system, an imaging element having 1,300,000 pixels (a pitch of picture element 3.6 μm) in ⅓ inches square is arranged.

This embodiment is a wide angle optical system where the focal length is 4.34 mm, Fno (fully opened F number) is 2.0, the image height is 3.0 mm, and half angle of field is 34°.

Numerical data of the optical components of the fourth embodiment is shown as follows.

numerical data 4 object surface (distance from an object) ∞ r1 = −30.00 (aspherical surface)    d1 = 0.6 seco   nd1 = 1.5831   vd1 = 56.4
r2 = −3.39 (aspherical surface)     d2 = 0.05
r3 = ∞ (aperture stop)              d3 = 0.05
r4 = 6.47 (aspherical surface)      d4 = 0.63       nd4 = 1.5256   vd4 = 56.4
r5 = −118.66 (aspherical surface)   d5 = 1.17
r6 = −0.67 (aspherical surface)     d6 = 0.50       nd6 = 1.5839   vd6 = 30.2
r7 = −1.15 (aspherical surface)     d7 = 0.05
r8 = 2.34 (aspherical surface)      d8 = 2.00       nd8 = 1.5256   vd8 = 56.4
r9 = 146.49 (aspherical surface)    d9 = 1.87
P = ∞ (image plane)

aspherical surfacecosfficient the first surface

K = 3.0461 × 10$^{-2}$
A4 = −5.7968 × 10$^{-2}$    A6 = −5.0086 × 10$^{-3}$ the second surface

K = 1.2822
A4 = −3.2530 × 10$^{-2}$    A6 = 6.5877 × 10$^{-4}$ the fourth surface

K = −1.1766 × 10
A4 = 2.5497 × 10$^{-2}$    A6 = −1.1011 × 10$^{-2}$ the fifth surface K = 0
A4 = −1.3653 × 10$^{-2}$    A6 = −2.4989 × 10$^{-2}$    A8 = 2.5114 × 10$^{-3}$ the sixth surface K = −8.7420 × 10$^{-1}$
A4 = 2.4172 × 10$^{-1}$    A6 = −3.1173 × 10$^{-2}$    A8 = 1.1131 × 10$^{-2}$ the seventh surface K = −6.1720 × 10$^{-1}$
A4 = 8.6272 × 10$^{-2}$    A6 = 2.5730 × 10$^{-2}$    A8 = 1.2117 × 10$^{-4}$ the eighth surface

K = −8.9329
A4 = 1.3227 × 10$^{-3}$    A6 = −7.7576 × 10$^{-5}$ the nineth surface

K = −1.8617 × 10$^{-11}$
A4 = −4.8201 × 10$^{-4}$    A6 = −3.6677 × 10$^{-4}$

In embodiments of the present invention, some of lenses are made of plastic. However, such lenses can be constituted with glass instead of plastic. For example, if the lenses are constituted with glass having refractive index higher than those used in the embodiments, an optical system with higher performance can be achieved. If special low dispersion glass is used, it is effective for the correction of chromatic aberration.

When a lens is constituted with plastic, degradation of the performance owing to environmental change can be mitigated by using low moisture-absorption material.

A flare cut stop may be used instead of an aperture stop in order to cut an unnecessary light of ghost, flare and the like. This flare cut aperture may be arranged in any place which is either in front of the first lens, between the first lens and the aperture stop, between the aperture stop and the second lens, between the second lens and the third lens, or between the third lens and the image plane. In order to get function of the flare cut stop, it is possible to use a method in which a flare light is cut by a frame, or another method in which a flare light is cut by arranging another member. Also, it is possible to constitute a flare cut stop by printing, painting and gluing a seal and the like, directly to the image forming optical system. As to the shape of the stop, any type of shape formed by such as a circle, an ellipse, a rectangle, a polygon and a scope surrounded by a function curve can be also used. It can be constituted so as to cut not only detrimental luminous flux but also luminous flux of the coma flare and the like on around the picture plane.

When a coating for preventing reflection is made to each lens, a ghost and flare can be reduced. If a multiple coating is made, the ghost and the flare can be efficiently reduced. Furthermore, infrared cut coating can be also made to a surface of a lens and a cover glass and the like.

Focusing can be carried out for adjusting the focus. As focusing methods, there are a type where the whole lenses or a part of lenses is moved outward for focusing, and other type where the whole lenses or a part of lenses is moved inward for focusing.

Decrease of the brightness around circumferential portion of a picture image plane can be reduced by shifting a micro lens of CCD. For example, the design of the micro lens of CCD may be changed according to the incidence angle of the light at each image height. Correction of decreased quantity of the brightness around circumferential portion of a picture image plane can be carried out by image processing.

Figure 9A:
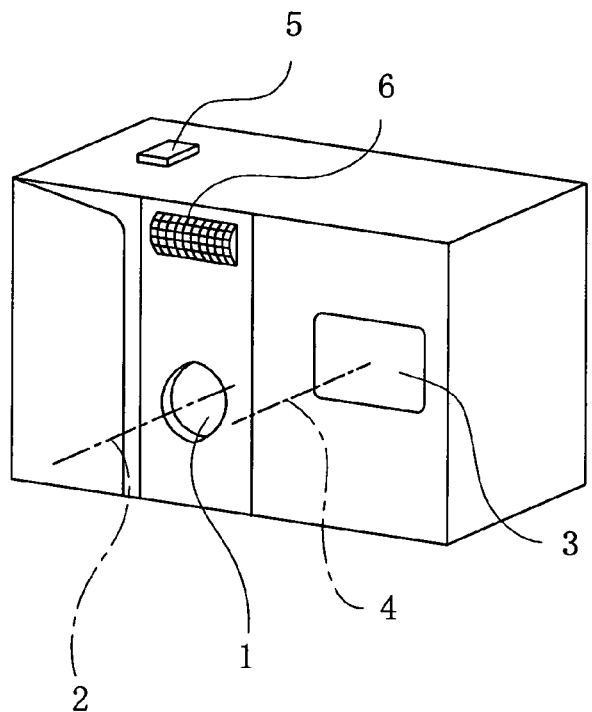
FIGS. 9A and 9B are a front view and a rear view showing an outlined construction of a cellular phone embodied by an image forming optical system according to the present invention.
Figure 9B:
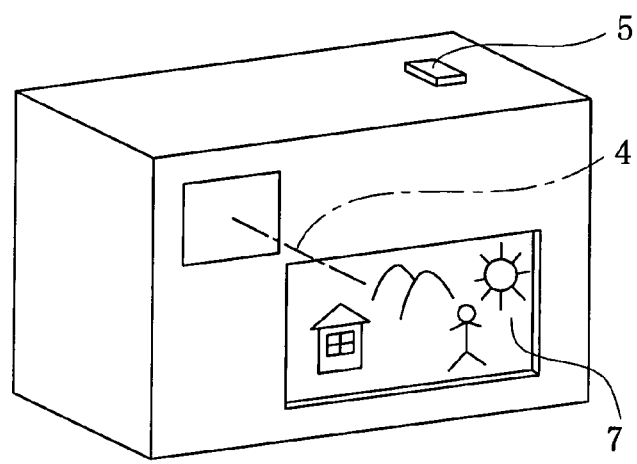

FIG. 9A is a front perspective view showing an external appearance of a digital camera in which an image forming optical system according to the present invention is used in a photographing optical system. FIG. 9B is a rear perspective view of the same. In FIG. 9, the reference numeral 1 represents a photographing optical system having photographing optical path 2, the reference numeral 3 is a finder optical system with an optical path 4 for finder, the reference numeral 5 is a shutter button, the reference numeral 6 is a flush lump and the reference numeral 7 is a monitor with liquid crystal display. When pressing the shutter button 5 arranged on the camera, in responding such action, photographing is carried out via the photographing optical system 1.

FIG. 10A is a front view showing an example of a cellular phone in which an image forming optical system according to the present invention is used in a photographing optical system. FIG. 10B is a side view of the same. In FIG. 10, the reference numeral 10 represents a microphone portion, the reference numeral 11 is a speaker portion, 12 is an input dial, 13 is a monitor, 14 is a photographing optical system and 15 is an antenna by which transmission and reception of electric waves for communication is performed. The microphone portion 10 inputs an operator's voice as information, and the speaker portion 11 outputs a communication partner's voice. The input dial 12 is used for an operator inputting information, and the monitor 13 displays information, such as photographed image of the operator as well as a telephone call partner, and a telephone number. The antenna 15 performs transmission and reception of electric waves for communication.

The photographing optical system 14 has the image forming optical system of the present invention arranged on the photographing optical path 16, and the imaging element which receives an image light, which are arranged in the cellular phone. IR cut filter is arranged in front of an imaging element, and a cover glass for protecting this optical system at the top of the photographing optical system 14 is arranged. The object image received with the imaging element is inputted into the processing means ( not illustrated) which is built in the cellular phone, and is displayed as an electronic picture on the monitor 13 and/or another monitor at a communication partner's side. When transmitting a picture image to a communication partner, an information of the object image received by the imaging element is converted into a signal which can be transmitted, by the signal-processing function included in the processing means mentioned above.

The numerical values calculated by the conditions of each embodiment 1 to 4 mentioned above are shown in the following table 1.

TABLE 1

|  | the first embodiment | the second embodiment | the third embodiment | the fourth embodiment |
| --- | --- | --- | --- | --- |
| f12/f | 0.74 | 0.75 | 0.81 | 0.93 |
| f12/f34 | −0.004 | −0.059 | 0.016 | 0.269 |
| f/r1f | −0.02 | −0.02 | −0.03 | −0.15 |
| f4/f | 0.96 | 1.01 | 1.11 | 1.00 |
| EXP/f | 1.38 | 1.25 | 1.23 | 1.53 |
| Fno/P[$\mu$m] | 1.33 | 1.25 | 0.93 | 0.56 |
| ML/TL | 0.077 | 0.083 | 0.071 | 0.072 |

What is claimed is:

1. An image forming optical system comprising:
   in order from an object side,
   a first lens which is meniscus lens having positive refracting power and a concave surface directed toward an object side,
   an aperture stop,
   a second lens having positive refracting power and a convex surface directed toward the object side,
   a third lens which is meniscus lens having negative refracting power and a convex surface directed toward an image side, and
   a fourth lens having positive refracting power.

2. An image forming optical system according to claim 1, wherein at least one of surface directed toward an object side or a surface directed toward an image side of the fourth lens is aspherical.

3. An image forming optical system according to claim 1 satisfying the following conditions:

$$0.3 < f12/f < 2.0$$

$$-0.30 < f12/f34 < 0.60$$

where f12 represents total focal length of the first lens and the second lens, f34 represents total focal length of the second lens and the third lens and f represents the focal length of the whole image forming optical system.

4. An image forming optical system according to claim 1, satisfying the following condition:

$$0.30(1/\mu m) < Fno/P(\mu m) < 2.40(1/\mu m)$$

where Fno represents the F number fully opened and P represents the pixel pitch of an imaging element.

5. An image forming optical system according to claim 1, satisfying the following condition:

$$0.02 < ML/TL < 0.15$$

where TL represents whole length of the image forming optical system and ML represents the minimum thickness on the axis of a plastic lens constituting the image forming optical system.

6. An image forming optical system according to claim 1, satisfying the following condition:

$$-0.50 < f/r1f < 0$$

where f is the focal length of the whole optical system, and r1f represents the radius of curvature of the first lens at the object side.

7. An image forming optical system according to claim 1, satisfying the following condition:

$$-0.5 < f4/f < 2.0$$

where f4 represents the focal length of the fourth lens and f represents the whole focal length of the image forming optical system.

8. An image forming optical system according to claim 1, satisfying the following condition:

$$0.5 < EXP/f < 2.5$$

where EXP represents the distance of the exit pupil from an image plane and f is the whole focal length of the image forming optical system.

9. An image forming optical system according to claim 1, wherein the fourth lens is made of plastic material.

10. An image forming optical system according to claim 1, wherein the third lens is made of plastic material.

11. An electric device equipped with the image forming optical system of claim 1.

\* \* \* \* \*